Jan. 26, 1960  W. M. HOULDSWORTH  2,922,845
UNDERCARRIAGE FOR PIE UTENSILS
Filed Aug. 26, 1952
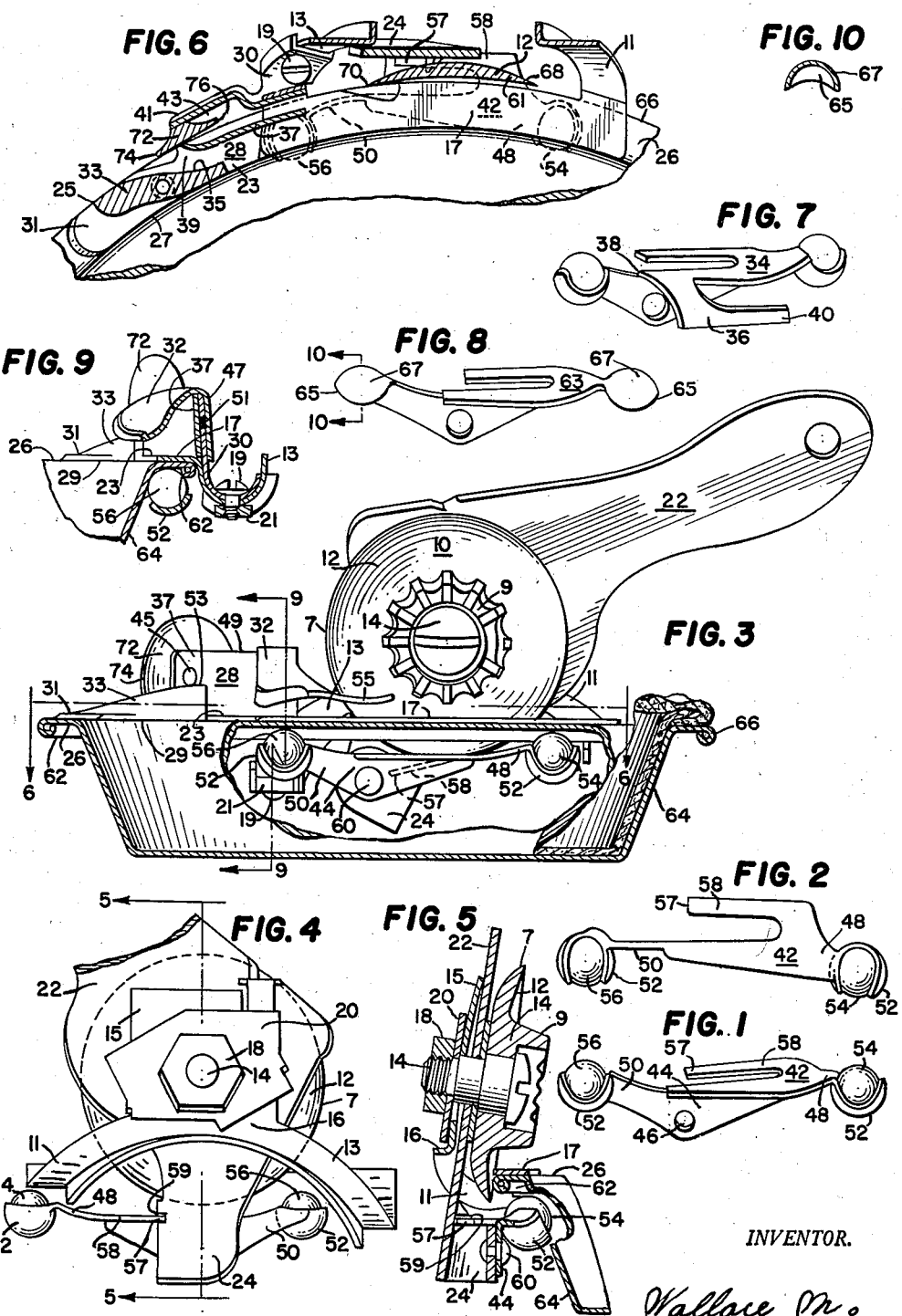
INVENTOR.
Wallace M. Houldsworth

United States Patent Office 2,922,845
Patented Jan. 26, 1960

2,922,845

UNDERCARRIAGE FOR PIE UTENSILS

Wallace M. Houldsworth, Royal Oak, Mich.

Application August 26, 1952, Serial No. 306,436

9 Claims. (Cl. 107—49)

This invention relates to an undercarriage for a pie crimping and trimming device. The undercarriage is operably carried by the device in such a manner as to contact and move along the underside of a pie pan rim so that the crimping and trimming elements which move along the upper side of the pan rim will not only be accurately aligned for more efficiency when guided thereabout but will also apply correct and uniform pressure to the dough being crimped. Thus, by the addition of the undercarriage, no reliance upon an operator's hand skill need be depended upon in order to obtain a uniformly trimmed and evenly crimped pie as is usually the case with prior art devices. This invention is an improvement over the undercarriage used in my copending application for United States patent, Serial No. 202,644, filed December 26, 1950, now U.S. Patent No. 2,759,438, dated August 21, 1956.

An important object of this invention is to provide an improved means of movably securing a utensil to the pan rim.

Another object is to provide means that will automatically engage the underside of the pie pan rim and align a culinary utensil on the top of the rim as the handle is lowered.

Another important object of this invention is to provide means of increasing the friction of the wheel on the forward side of the shaft, and of decreasing the friction on the rearward side of the shaft.

Another important object of this invention is to provide additional friction for the wheel other than the crust material over which it passes.

All of the foregoing and still further objects and advantages of the invention will become more fully apparent from a study of the specification, taken in connection with the drawings, wherein:

Fig. 1 is a perspective view of the main form of the undercarriage showing the side that faces next to the pie pan wall when in use.

Fig. 2 is a top view of the main form of the undercarriage.

Fig. 3 is an inside view showing the undercarriage in operable position, secured to a pie crimping utensil, which is positioned on a secton of a pie pan rim. Note that a portion of the pan wall is cut away for clarity.

Fig. 4 is an outside view of part of the utensil shown in Fig. 3, in released inoperative position, and showing the undercarriage secured thereto.

Fig. 5 is a cross-sectional view taken on lines 5—5 of Fig. 4, the outer end of the handle having been omitted.

Fig. 6 is a cross-sectional view taken on lines 6—6 of Fig. 3, the broken lines showing the flexed contour of the Fig. 1 undercarriage when in use.

Fig. 7 is a perspective view showing a modification of Fig. 1.

Fig. 8 is a perspective view showing the side that faces next to the pie pan wall when in use, and the top of the simplest form of an undercarriage.

Fig. 9 is a cross-sectional view taken on lines 9—9 of Fig. 3.

Fig. 10 is a cross-sectional view taken on lines 10—10 of Fig. 8.

Referring to the drawings and particularly to Figs. 3 and 4, the embodiment of a culinary utensil similar to those that will be adapted for use with this invention, illustrated herein (on which a patent application Serial No. 306,439 was filed on Aug. 26, 1952), includes a conventional type crimping and trimming wheel 10, namely, a centrally located crimping boss 9, surrounded by a dished or concaved flange 12, having a peripheral cutting edge 7. Boss 9 is journaled on a shaft 14 which is secured to a support 16 by a retainer plate 20 and a nut 18, as shown in Figs. 3, 4 and 5. A handle 22 journaled to shaft 14 has a downwardly projecting portion 24 which extends underneath the pie pan rim where it provides a support for the undercarriage.

The support member 16 includes an integral arcuate fork-shaped frame provided with a horizontal curved bearing plate 17 which connects the lower ends of the rear arm 11 and the front arm 13. The junction of said arms terminates in an up-right back plate 15. The bearing plate 17 with its edges curved similar to the edges of a pan rim, is shown in Figs. 3, 5, 6 and 9. Thus a wheel 10 is rotatably supported on the shaft 14 over the curved plate 17 with a portion of the flange 12 projecting therebelow and with portion 24 operably projecting between the arms 11 and 13, beyond the edge of a pan rim, as shown in Fig. 4 and especially Fig. 5 where a fragment of a pan rim 26 is shown. To mount the utensil, the curved plate is inserted between the bottom surface of the pie crust material and the top of the pan rim, so that the crust lies between the bottom of the boss 9 of the wheel and the top of the plate 17. The undercarriage is positioned below the pan rim, and as the handle is lowered the undercarriage is moved upwardly into contact with the underside of the rim. A companion utensil 28, which forms the subject matter of my copending application Serial No. 306,437, filed Aug. 26, 1952, now Patent No. 2,864,323, is shown secured to the crimping and trimming utensil in order to illustrate the undercarriage in use with two trimming wheels; 10 and 72 respectively. Utensil 28 in use, rests upon the upper surface of the rim 26 for slidable movement thereon, so that joint operation with the crimping utensil may be had. In order to secure the utensil 28 to the crimping utensil, a bracket 30, integral with utensil 28, has been provided, which is shaped to fit over the arm 13 of support 16 and joined thereto by a screw 19 and nut 21, as shown in Figs. 3, 6 and 9.

The utensil 28 has a base portion 23 whose side edges 25 and 27 are formed to approximate the curvature of the pan rim and is provided with a flat bottom 29 so that it can slide on the upper surface of the rim 26. The base 23 has a flat forward point 31, and a ridge 33 formed to incline upward to a predetermined required height from the forward outer edge 25 as it projects rearward to the inner edge 27. The side 35 of the ridge is vertical and the base 23 has a vertical upright portion 37, thus forming a groove 39, as shown in Figs. 3, 6 and 9. The bracket 30 also projects upward and is spot welded at 51 to the portion 37, and it has a forward portion 41 that is formed to project in spaced relation to the portion 37, to form a slot 43 for the trimming wheel 72 which is journaled on a rivet 45 within said slot, as shown in Figs. 3, 6 and 9. This utensil is mounted on the pan rim, with the point 31 and ridge 33 beneath the crust material, so as to raise the overhanging crust back over the rim as the crust slides up the ridge 33, and at the same time vertically folding the crust while severing the excess crust material in the path of wheel 72 while it is propelled around on the pan rim, thus producing a multilayer crust edge. Utensil 28 has a return crust guide 32 with a supporting portion 47 which projects downwardly and is spot welded at 51 to the outer surface of bracket 30. Guide 32 in the form of an arch projects from the top 49 of portion 37 inwardly to a curved formation at a spaced distance beyond the curved inner edge 27 and below the tangential plane of the summit 53 of the ridge 33, as shown in Figs. 3 and 9. The arched formation of the crust guide 32 narrows as it projects rearwardly where it terminates in a vertically movable curved spring extending horizontally in spaced relation to the tangential plane of the bottom surface 29 of base portion 23. In use, utensil 28 as it moves along the pan rim beneath the crust, raises the crust upwardly so that it drapes over ridge 33. Upon further movement of the utensil, the crust is raised vertically to form a folded edge of four layers, whereupon the crust contacts the guide 32 which turns the folded edge onto the pan rim so that it lies in a horizontal position facing outwardly of the pan center in advance of the crimping wheel 10 which then crimpingly seals the crust as it passes thereover. Thus the raw or cut edges of the top and bottom crusts are tucked inwardly below the fold so as to face the center of the pan. But if the bottom crust is trimmed separately, a folded edge of three layers is formed, as shown in Fig. 3.

In Figs. 1 and 2 the main form of this invention is shown, the member 42 being made of spring material having a supporting wall 44 with an aperture 46, a horizontal arm 48 formed to allow resilient vertical movement, a vertical arm 50 formed to allow resilient horizontal movement, and a resilient leveling finger 58, adapted to return the undercarriage to its non-operative position. The ends of the arms have retainer sockets 52—52 carrying spherical elements 54—56 for rotation therein. Handle 22 which is pivoted on shaft 14 has a lower portion 24 which carries a shouldered rivet 60 on which member 42 is mounted for a rocking movement. The location of rivet 60 is such, that sufficient clearance is provided between the bottom surface of supporting member 17 and the top of member 42 and its oppositely extending arms 48 and 50, in order that a pie pan rim can be received therebetween as shown in Figs. 3 and 5. The leveling finger 58 has a free end 57 which is loosely assembled in a slot 59 of the handle portion 24 as shown in Figs. 4 and 5.

Since the handle 22 is pivoted to the utensil above the height of plate 17, the portion 24 and the pivotally attached undercarriage member 42 will swing upwardly as the outer end of the handle is lowered, so that the spherical element 56 is brought into contact with the rolled edge 62 of the pan rim 26 and the outside surface of the pan wall 64, as shown in Fig. 9 and as the upward movement continues the spherical element 54 contacts the rolled edge 62 of the pan rim 26 and the outside surface of the pan wall 64 similar to element 56 as shown in Fig. 9.

The spherical elements in locating themselves below the pan rim, automatically align the utensil on the top of the pan rim, so that the flange 12 of the wheel 10 can be positioned so as to clear the outer edge 66 of the pan rim 26, thus preventing interference with the rotation of the wheel 10.

As previously stated the horizontal arm 48 allows resilient vertical movement, and as the spherical element 54 locates below the pan rim, the rear edge 68 of the flange 12 is positioned to clear the outer edge 66 of the pan rim 26. The lower portion 24 of the handle 22 and the supporting intermediate wall 44 can be formed and positioned one to the other, or the vertical arm 50 which allows resilient horizontal movement can be formed, so that when the spherical element 56 locates below the pan rim the front edge 70 of the flange 12 is held snugly against the outer edge 66 of the rim 26 by the spring tension of the arm 50, thus increasing the friction for better rotation of the wheel 10, as shown in Fig. 6. If the utensil 28 has a trimming wheel 72 as illustrated in Figs. 3 and 6, then said wheel 72 should have the additional friction for rotation, that was just described for the wheel 10. Such friction would be provided if the forward edge 74 of the wheel 72 is held snugly against the outer edge 66 of the rim 26, and the rearward edge 76 of the wheel 72 is held clear of the pan rim edge 66, as shown in Fig. 6.

The ends 52—52 of the arms of the undercarriage have been described as being formed to rotatably secure spherical elements for contact beneath the pan rim. In Fig. 7 a modification is shown, the member 34 is made and used in the same manner as member 42 previously described, except that member 34 has a brace portion 36 in the form of an arch projecting downwardly from the top edge 38 and in spaced relation to the mid-section of member 34. The brace portion 36 has a free end 40 projecting rearwardly in a substantial vertical formation allowing resilient horizontal movement. The free end 40 will contact the outer surface of the side wall 64 of the pan when assembled thereon, to serve as a counter brace to better balance a utensil on the pan rim 26, and in event the utensil is overbalanced beyond the outer edge of the pan rim. The arm ends may be formed to have slidable bearing surfaces as shown in Figs. 8 and 10. In Fig. 8 the member 63 is shown made and used in the same manner as previously described for member 42, except that the ends 65—65 of the arms are formed to have slidable bearing surfaces 67—67 to contact the rolled edge 62 of the pan rim 26 and the pan wall 64, thus eliminating the spherical elements, and of course the member 63 could have a brace similar to the member 34.

In general, as a result of this invention, there has been provided an improved undercarriage capable of use with one or more culinary utensils of unlike functions, either singly or jointly. The undercarriage has been designed to releasably engage the underside of a pie pan rim in a manner that aligns the utensil or utensils for movement about the top of the pie pan rim, so that they automatically follow the curved contour thereof while being propelled, even where the utensil includes one or more wheel-like elements.

The mechanisms which have been specifically described above are to be considered as illustrative, variations and alterations may be made therein without departing from the spirit and scope of the invention.

What I claim is:

1. An undercarriage device for a pie crimping and trimming utensil comprising, a pair of elongated leaf springs, support means joining said springs in a straight line, end-to-end relationship, with the plane of flexure for one spring being vertical, and for the other, horizontal, when said device is in an operative position beneath a horizontally disposed pie plate rim, said support being provided with pivot means so that said device is adapted when in use, to rock about a horizontal axis transverse to the longitudinal axis of the straight line spring assembly, and surface contact means on each free end of said springs, so disposed that the engaging surface of each contact means is at a higher elevation than both the springs and the support, when said device is positioned beneath the said pie plate rim having a rolled under peripheral bead, whereby, through flexure of the said springs, and rocking of said support movable engagement of each contact means can be established with the underside of the rim, between the bead and the outer wall surface of the said pie pan, in a path conforming to the path of the rim.

2. The device of claim 1 in which each of said contact means consists of a member having a slidable surface attached to each of said springs.

3. The device of claim 1 in which each of said contact means consists of a rotatable member mounted on each of said springs so as to present a rolling surface contact with said rim.

4. The device of claim 1 in which said contact means consists of a ball seated in an open socket and attached to each of said springs.

5. The device of claim 1 in which said vertically flexing spring is provided with an L-shaped resilient leveling finger, one leg of said finger being secured to the vertically flexing spring the other leg of said finger extending in a like direction to that of said horizontally flexing spring, both legs of said finger being horizontally disposed from said vertically flexing spring, the free leg of said finger being adapted to flex vertically and its free end being adapted for engagement with a part of the pie crimping and trimming utensil so as to resiliently hold said undercarriage device in an operative position with respect to said utensil.

6. The device of claim 5 wherein said support is provided with an L-shaped resilient brace member disposed on the side opposite to the side along which said leveling finger is disposed, said brace member having one leg secured to and extending outwardly from said support, the other leg of said brace extending in a like direction to that of the vertically flexing spring, and both legs of said brace being horizontally disposed from said support so that the free leg of said brace is adapted to flex horizontally when moved into engagement with the outer wall surface of said pan, whereby the utensil is steadied when in use.

7. The device of claim 1 in which said support means is provided with a brace for engagement with the outer wall surface of the pie pan when the utensil is in use to steady same, said brace comprising an L-shaped resilient element having one leg thereof secured to and extending outwardly from said support, the outer leg of said brace extending in a like direction to that of the vertically flexing spring, and both legs of said brace being horizontally disposed from said support so that the free leg of said support is adapted to flex horizontally upon contact with the surface of said pan wall.

8. An undercarriage device for a pie crimping and trimming utensil comprising, a pair of elongated leaf springs, support means joining said springs in a straight line, end-to-end relationship, with the plane of flexure for one spring being vertical, and for the other, horizontal, when said device is in an operative position beneath a horizontally disposed pie plate rim, said support being provided with pivot means so that said device is adapted when in use, to rock about a horizontal axis transverse to the longitudinal axis of the straight line spring assembly, and surface contact means on each free end of said springs, so disposed that the engaging surface of each contact means is at a higher elevation than both the springs and the support, when said device is positioned beneath the said pie plate rim having a rolled under peripheral bead, whereby, through flexure of the said springs, and rocking of said support movable engagement of each contact means can be established with the underside of the rim, between the bead and the outer wall surface of the said pie pan, in a path conforming to the path of the rim, an L-shaped resilient leveling finger, one leg of said finger being secured to the vertically flexing spring the other leg of said finger extending in a like direction to that of said horizontally flexing spring, both legs of said finger being horizontally disposed from said vertically flexing spring, the free leg of said finger being adapted to flex vertically and its free end being adapted for engagement with a part of the pie crimping and trimming utensil so as to resiliently hold said undercarriage device in an operative position with respect to said utensil.

9. An undercarriage device for a pie crimping and trimming utensil comprising, a pair of elongated leaf springs, support means joining said springs in a straight line, end-to-end relationship, with the plane of flexure for one spring being vertical, and for the other, horizontal, when said device is in an operative position beneath a horizontally disposed pie plate rim, said support being provided with pivot means so that said device is adapted when in use, to rock about a horizontal axis transverse to the longitudinal axis of the straight line spring assembly, and surface contact means on each free end of said springs, so disposed that the engaging surface of each contact means is at a higher elevation than both the springs and the support, when said device is positioned beneath the said pie plate rim having a rolled under peripheral bead, whereby, through flexure of the said springs, and rocking of said support movable engagement of each contact means can be established with the underside of the rim, between the bead and the outer wall surface of the said pie pan, in a path conforming to the path of the rim, an L-shaped resilient leveling finger, one leg of said finger being secured to the vertically flexing spring the other leg of said finger extending in a like direction to that of said horizontally flexing spring, both legs of said finger being horizontally disposed from said vertically flexing spring, the free leg of said finger being adapted to flex vertically and its free end being adapted for engagement with a part of the pie crimping and trimming utensil so as to resiliently hold said undercarriage device in an operative position with respect to said utensil, an L-shaped resilient brace member disposed on the side opposite to the side along which said leveling finger is disposed, said brace member having one leg secured to and extending outwardly from said support, the other leg of said brace extending in a like direction to that of the vertically flexing spring, and both legs of said brace being horizontally disposed from said support so that the free leg of said brace is adapted to flex horizontally when moved into engagement with the outer wall surface of said pan, whereby the utensil is steadied when in use.

References Cited in the file of this patent

UNITED STATES PATENTS

| Number | Name | Date |
|---|---|---|
| 508,077 | Anderson | Nov. 7, 1893 |
| 524,400 | Rinman | Aug. 14, 1894 |
| 543,953 | Whitney et al. | Aug. 6, 1895 |
| 1,441,974 | Earll | Jan. 9, 1923 |
| 1,634,908 | Lynch et al. | July 5, 1927 |